US011442980B2

(12) United States Patent
Hsiao

(10) Patent No.: US 11,442,980 B2
(45) Date of Patent: *Sep. 13, 2022

(54) SYSTEM AND METHOD FOR PHOTO SCENE SEARCHING

(71) Applicant: Oath Inc., New York, NY (US)

(72) Inventor: JenHao Hsiao, Taipei (TW)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/222,241

(22) Filed: Dec. 17, 2018

(65) Prior Publication Data
US 2019/0121821 A1    Apr. 25, 2019

Related U.S. Application Data

(63) Continuation of application No. 14/664,011, filed on Mar. 20, 2015, now Pat. No. 10,157,192.

(51) Int. Cl.
| G06F 16/532 | (2019.01) |
| G06F 16/583 | (2019.01) |
| G06F 16/54 | (2019.01) |
| G06F 16/21 | (2019.01) |

(52) U.S. Cl.
CPC ........... G06F 16/532 (2019.01); G06F 16/54 (2019.01); G06F 16/583 (2019.01); G06F 16/5838 (2019.01); G06F 16/21 (2019.01)

(58) Field of Classification Search
CPC .. G06F 16/5838; G06F 16/532; G06F 16/583; G06F 16/21; G06F 16/50; G06F 16/54; G06F 16/55

USPC ........................................................ 707/740
See application file for complete search history.

(56) References Cited

U.S. PATENT DOCUMENTS

| 7,761,464 | B2 * | 7/2010 | Radlinski | G06F 16/9535 |
| | | | | 707/706 |
| 8,352,494 | B1 * | 1/2013 | Badoiu | G06F 16/24554 |
| | | | | 707/780 |
| 2011/0126236 | A1 * | 5/2011 | Arrasvuori | H04N 21/4532 |
| | | | | 725/46 |
| 2011/0216236 | A1 * | 9/2011 | Kasahara | H04N 5/23216 |
| | | | | 348/370 |
| 2012/0047134 | A1 * | 2/2012 | Hansson | G06F 16/338 |
| | | | | 707/731 |
| 2014/0096048 | A1 * | 4/2014 | Rottler | G06F 3/0486 |
| | | | | 715/769 |

(Continued)

*Primary Examiner* — Shahid A Alam

(57) ABSTRACT

Users may have a variety of photos, but lack a mechanism to organize the photos. For example, a user may desire to access a photo of a child in front of a national monument, but may be unable to locate the photo amongst the photos. Accordingly, a photo query may be generated utilizing a photo query interface populated with a face query attribute (e.g., a proxy icon, a photo of a face, etc.), a face position attribute (e.g., a position of the face query attribute), and/or a location query attribute (e.g., a background of a photo, such as a forest, a monument, etc.) using drag and drop functionality and/or any other query construction functionality. One or more photos having attributes corresponding to the photo query may be identified and provided to the user.

20 Claims, 16 Drawing Sheets

(56) References Cited

U.S. PATENT DOCUMENTS

2014/0181652 A1* 6/2014 Stanke ................ G06F 9/453
　　　　　　　　　　　　　　　　　　715/708
2016/0042253 A1* 2/2016 Sawhney ............ G06F 16/3322
　　　　　　　　　　　　　　　　　　382/190

* cited by examiner

SYSTEM AND METHOD FOR PHOTO SCENE SEARCHING

CROSS REFERENCE TO RELATED APPLICATION

This application claims priority to and is a continuation of U.S. application Ser. No. 14/664,011, filed on Mar. 20, 2015, entitled "A SYSTEM AND METHOD FOR PHOTO SCENE SEARCHING", which is incorporated herein.

BACKGROUND

Users may have a large number of photos, such as photos of friends, family, vacations, etc. A user may not have an organizational scheme and/or a mechanism for easily accessing the photos. The user may be unable to find a photo of a particular event, person, etc. In an example, the user may desire to find a photo of the user's grandmother, but because the user may not have stored the photos in an organized manner, the user may be unable to find the photo (e.g., photos of the user's grandmother may not be tagged as containing the grandmother or saved in a folder related to the user's grandmother). In an example, the user may remember a position of people and/or a person in a photo that the user may want to access, however, the user may not have a mechanism to search for the photo based upon the position of the people and/or the person. In an example, the user may remember a location in a background of a photo (e.g., the background may comprise a famous monument) that the user may want to access, however, the user may not have a mechanism to search for the photo based upon the location depicted in the background. Unfortunately, many applications and services may lack functionality for identifying photos based upon the background, the position of people in the photo, and/or the identity of the people in the photo.

SUMMARY

In accordance with the present disclosure, one or more systems and/or methods for searching images are provided. In an example, a photo organization functionality may be implemented for grouping photos based upon a face attribute (e.g., an identification of a facial feature, gender, age, accessories, clothing, skin tone, or other features of a person), a face position attribute (e.g., a position of the face attribute of the person in a photo), and/or a location attribute (e.g., features of a background of the photo). In an example of searching images, a photo query interface may be generated and populated with a face query attribute (e.g., a user interface element, such as a proxy icon, representing a particular face attribute that may be used to formulate a photo query for photo searching, such as a photo of a face, a female proxy icon, an age input box, etc.), a face position query attribute (e.g., a user interface element, such as the proxy icon, representing a particular position of a face attribute that may be used to formulate the photo query for photo searching, such as a centered position query term), and/or a location query attribute (e.g., a user interface element, such as a proxy icon, representing a particular background that may be used to formulate the query for photo searching, such as a waterfall background query term).

The photo query interface may be displayed to a user. The user may construct a photo query based upon a drag and drop command facilitated by the face position query attribute, the face query attribute, and/or the location query attribute (e.g., the user may select and/or drag and drop the female proxy icon and a waterfall background icon to create a query for photos of females standing near a waterfall). Responsive to receiving the photo query, one or more photos having attributes corresponding to the photo query may be identified. The one or more photos may be identified by associating the face query attribute with a photo feature detection model and utilizing the photo feature detection model to identify facial features (e.g., an identification of a person, gender, age, accessories, skin tone, etc.) in the face query attribute. The one or more photos may be identified by associating the face position query attribute with the photo feature detection model and utilizing the photo feature detection model to identify a position of the face query attribute relative to a second face query attribute, the location query attribute, and/or a perimeter of the photo query interface (e.g., identification of a photo where the female is located near a second female or where the female is located near a right corner of the photo). The one or more photos may be identified by associating the location query attribute with the photo feature detection model and utilizing the photo feature detection model to extract the background comprising the location query attribute. The one or more photos may be provided to the user as photo search results.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
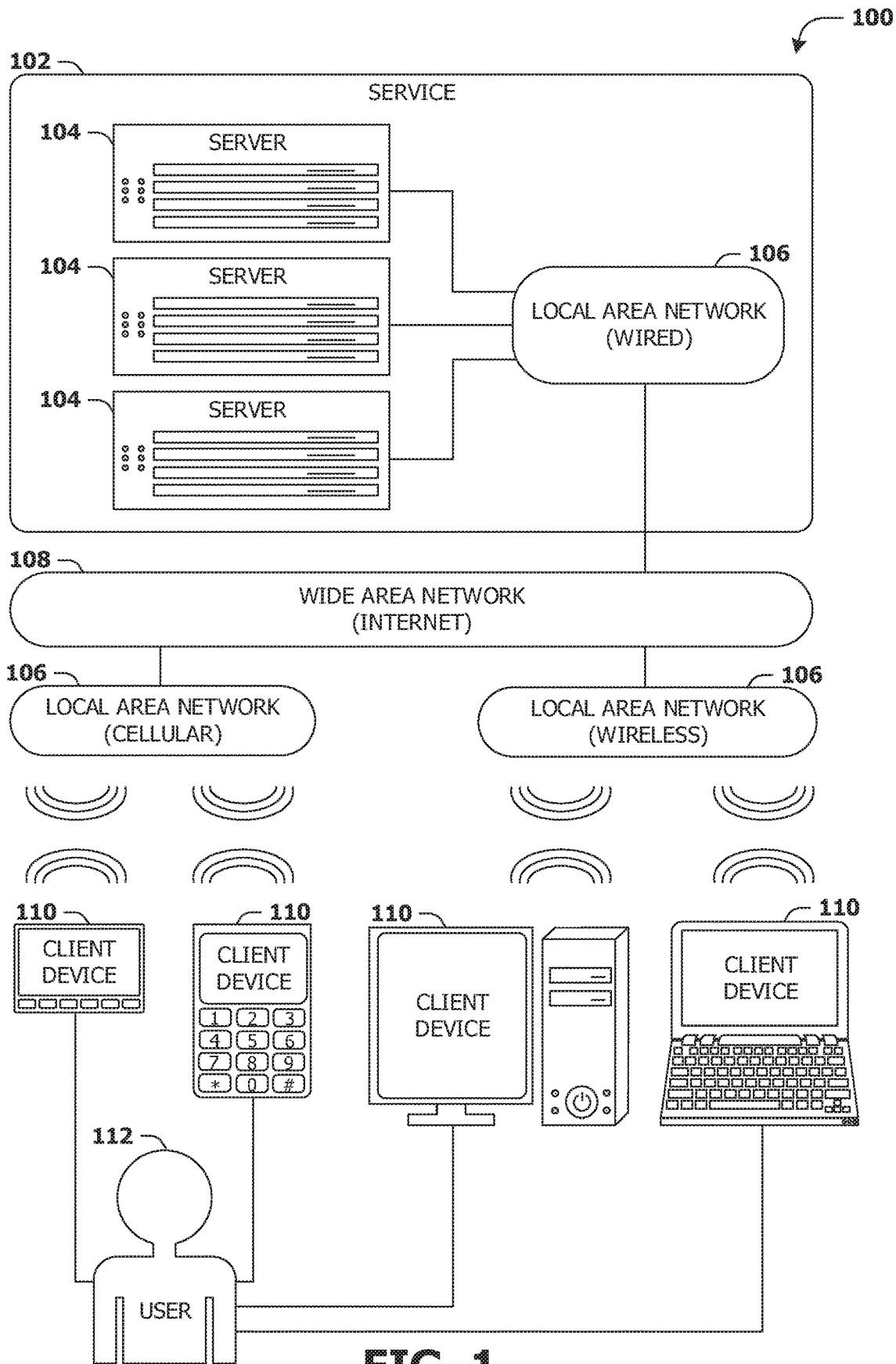
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
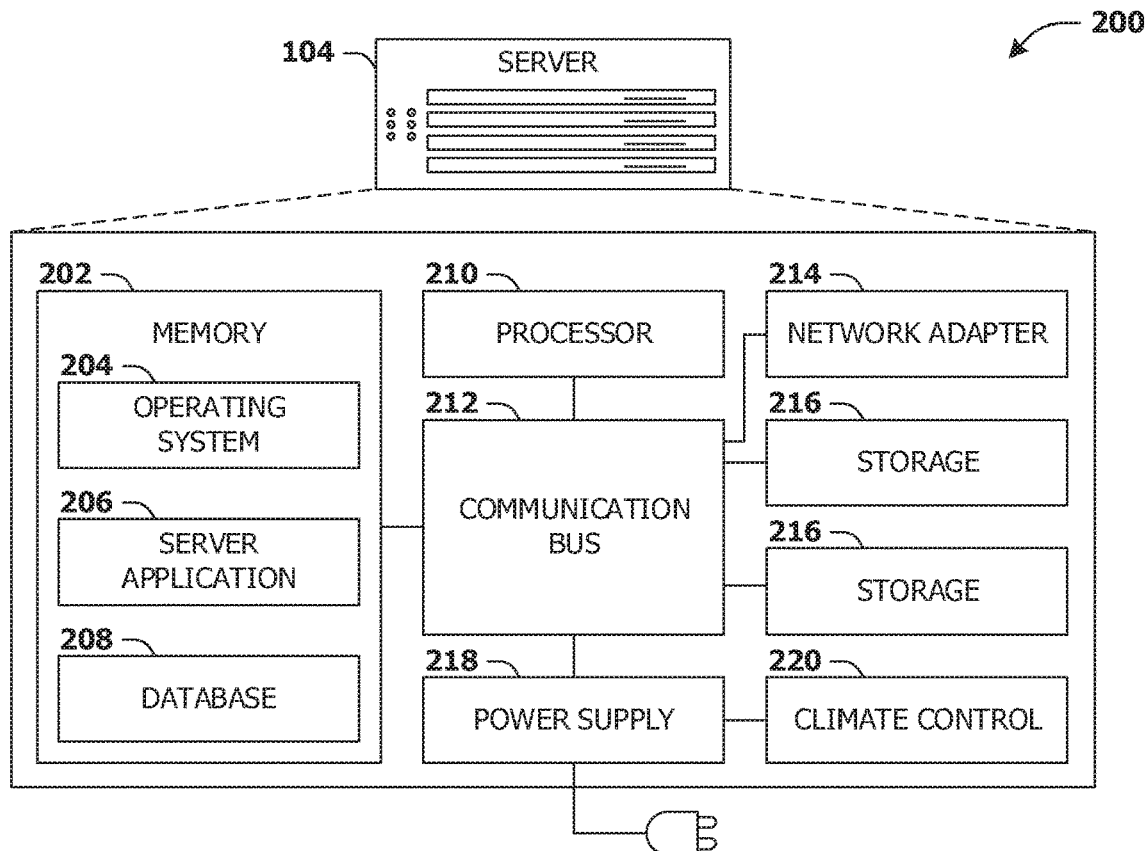
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
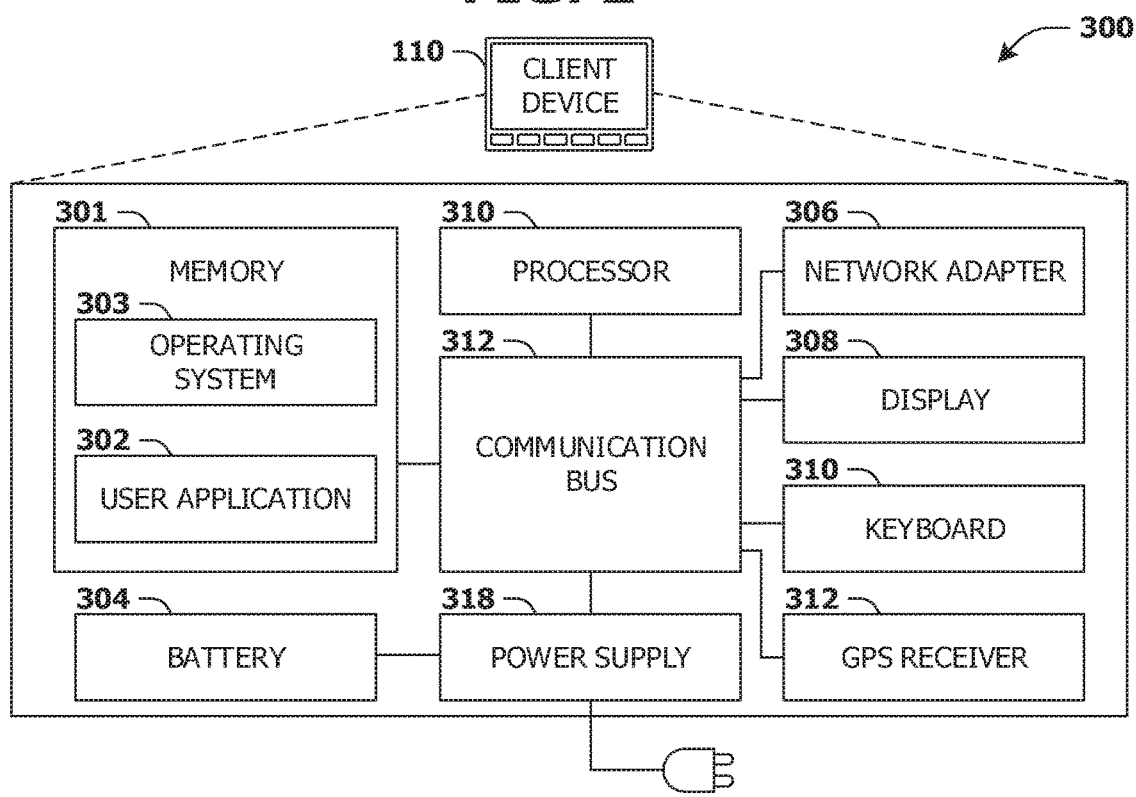
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for searching images are provided. Users may have a large number of photos, including photos of friends, family, vacations, etc. Many applications, websites, and/or services may be unable to provide a user with the ability to search for photos of a particular person (e.g., an aunt, a child, etc.) at a particular location (e.g., near a volcano, in front of a capital building, etc.) and/or based upon a position of a face in a photo.

As provided herein, an ability to search images based upon constructing a photo query using a face query attribute (e.g., a user interface element representing a face query term, such as a gender query term), a face position query attribute (e.g., a user interface element representing a position query term, such as a face position within a photo query term), and/or a location query attribute (e.g., a user interface element representing a background query term, such as a waterfall background feature query term) may aid the user in efficiently accessing photos more quickly than manual searching. The ability to provide users with desired images may reduce network bandwidth, time, and/or computing resources otherwise utilized by users in an attempt to locate such photos on their own (e.g., manually searching through individual photos, searching one or more folders comprising photos, searching a photo sharing web service, etc.).

Figure 4A:
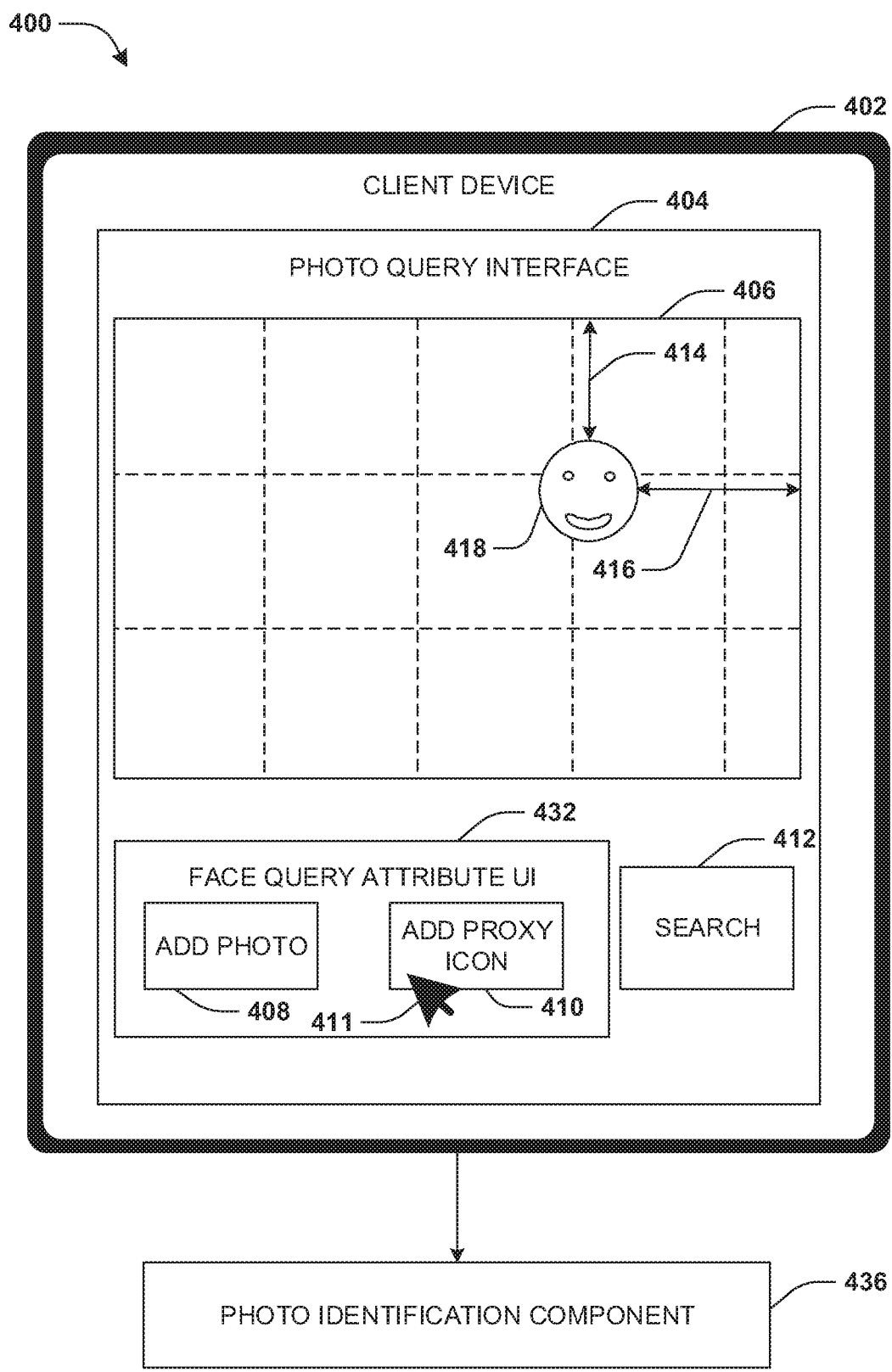
FIG. 4A is a component block diagram illustrating an example system for searching images, where a photo query is constructed using a proxy icon.
Figure 4B:
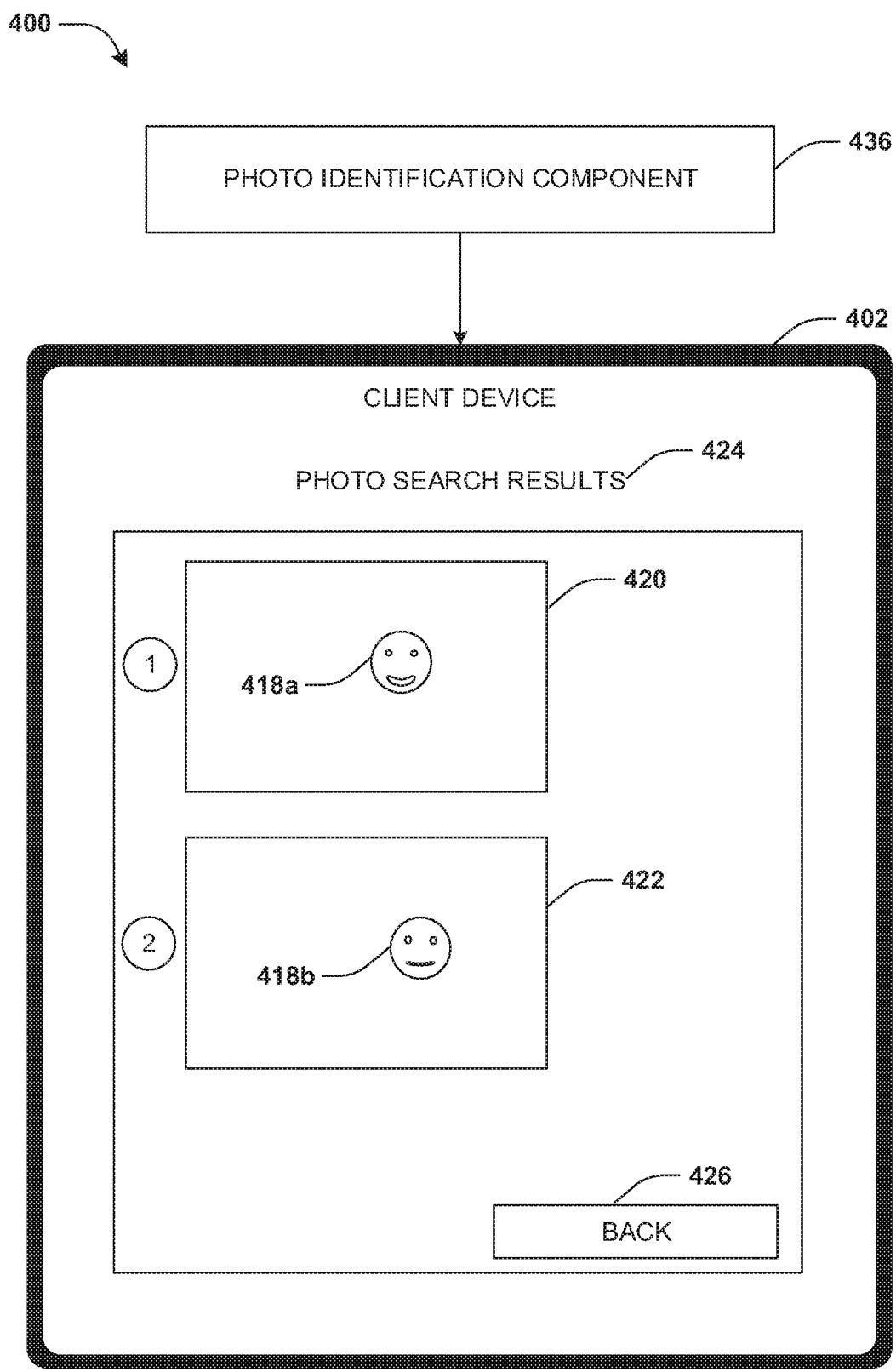
FIG. 4B is a component block diagram illustrating an example system for searching images, where a photo query is used to generate photo search results.

FIGS. 4A-4B illustrate an example of a system 400 for searching images using a photo query interface 404. A user, on a client device 402, may access a photo identification component 436 (e.g., hosted on the client device 402 or hosted on a remote device such as a photo management server). The photo identification component 436 may generate the photo query interface 404 for display to the user through the client device 402. The photo query interface 404 may present the user with a face query attribute user interface 432 comprising an option to add a photo 408 and/or add a proxy icon 410. In an example, the user may select 411 the add a proxy icon 410 option. The user may be presented with a proxy icon 418. The user may place the proxy icon 418 on a grid 406 of the photo query interface 404. The user may place the proxy icon 418 utilizing drag and drop functionality. The user may place the proxy icon 418 in a position of the grid 406 corresponding to a position of a face in a photo that the user may desire to access (e.g., the user may be searching for a photo where a person's face was depicted in the photo at the location of the proxy icon 418).

In an example, the position of the proxy icon 418 may be relative to a second face query attribute (e.g., a second proxy icon, not illustrated, placed on the grid 406 by the user because the photo that the user may be searching for may depict a second person's face at a second location of the second proxy icon), a location query attribute (e.g., the position of the proxy icon 418 relative to a park bench location query attribute because the user may be searching for the photo of two friends in a park), and/or a perimeter of the grid 406 of the photo query interface 404. In an example, the proxy icon 418 may be a first distance 414 from a top portion of the grid 406, and a second distance 416 from a side portion of the grid 406. Responsive to the user selecting search 412, the photo identification component 436 may construct a photo query based upon the location of the proxy icon 418. For example, the photo query may search photos depicting a face of a person at the position of the proxy icon 418 (e.g., and/or photos depicting a second face of a second person at the second position of the second proxy icon and a park bench).

FIG. 4B illustrates the photo identification component 436 generating photo search results 424. The photo identification component 436 may identify the face position query attribute from the photo query and associate the face position query attribute with a photo feature detection model. The photo feature detection model may be utilized to identify the position of the face query attribute (e.g., the proxy icon 418) relative to the perimeter of the photo query interface 404. The position may comprise coordinates on a plane corresponding to a relative position on the grid 406, a proportional distance of the proxy icon 418 from the perimeter of the photo query interface 404, etc. The photo identification component 436 may search a database comprising one or more photos (e.g., indexed by face attributes, positions of face attributes, and/or background features) to identify one or more photos, such as a first photo 420 and a second photo 422, comprising attributes corresponding to the photo query (e.g., a photo comprising a face in a position corresponding to the position of the proxy icon 418).

Responsive to identifying one or more photos corresponding to the photo query, the one or more photos may be presented to the user, on the client device 402, as the photo search results 424. The photo search results 424 may be ranked (e.g., a more prominent position on a page may indicate a higher rank). In an example, the first photo 420 may be ranked first, as denoted by a number 1, and the second photo 422 may be ranked second, as denoted by a number 2. The first photo 420 may correspond more closely to the photo query than the second photo 422. In an example, the first photo 420 may have a first face 418a in a first position that may be relatively more similar to the position of the proxy icon 418 than a second position of a second face 418b of the second photo 422. If the user is not presented with a photo that the user desires, then the user may select back 426 to return to the photo query interface 404 to perform an additional search.

Figure 5A:
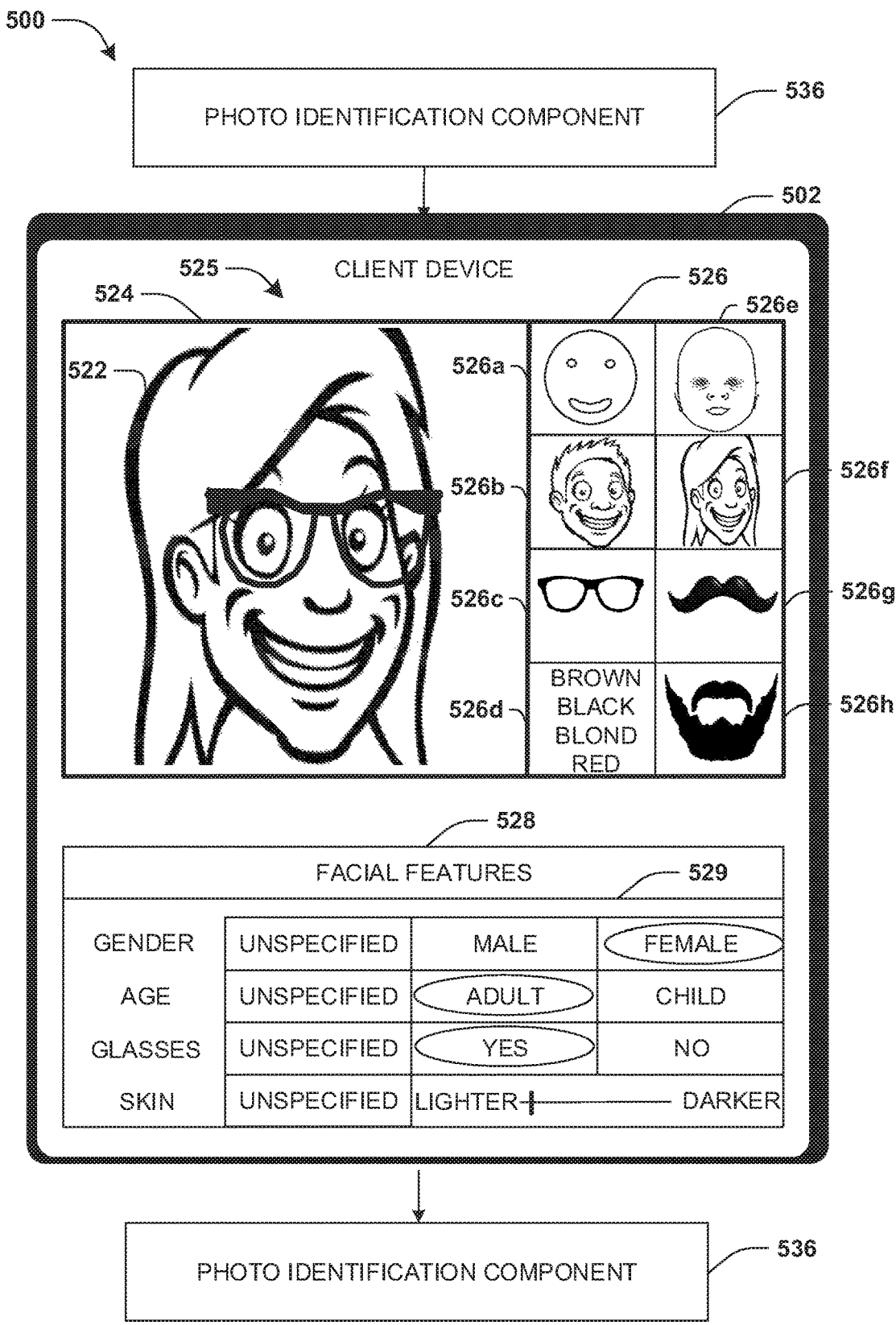
FIG. 5A is a component block diagram illustrating an example system for searching images, where a proxy icon is generated.
Figure 5B:
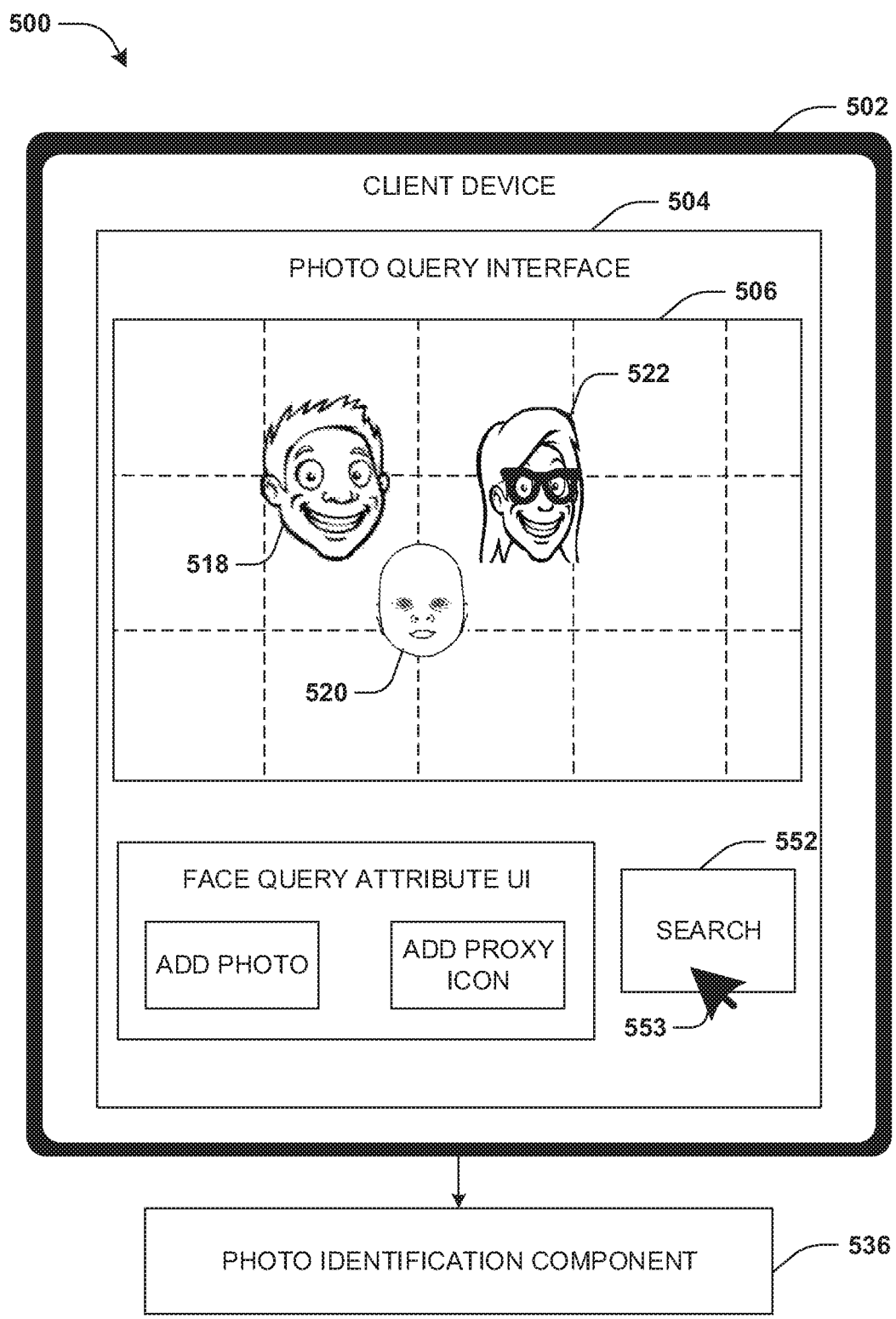
FIG. 5B is a component block diagram illustrating an example system for searching images, where a photo query is constructed using a proxy icon.
Figure 5C:
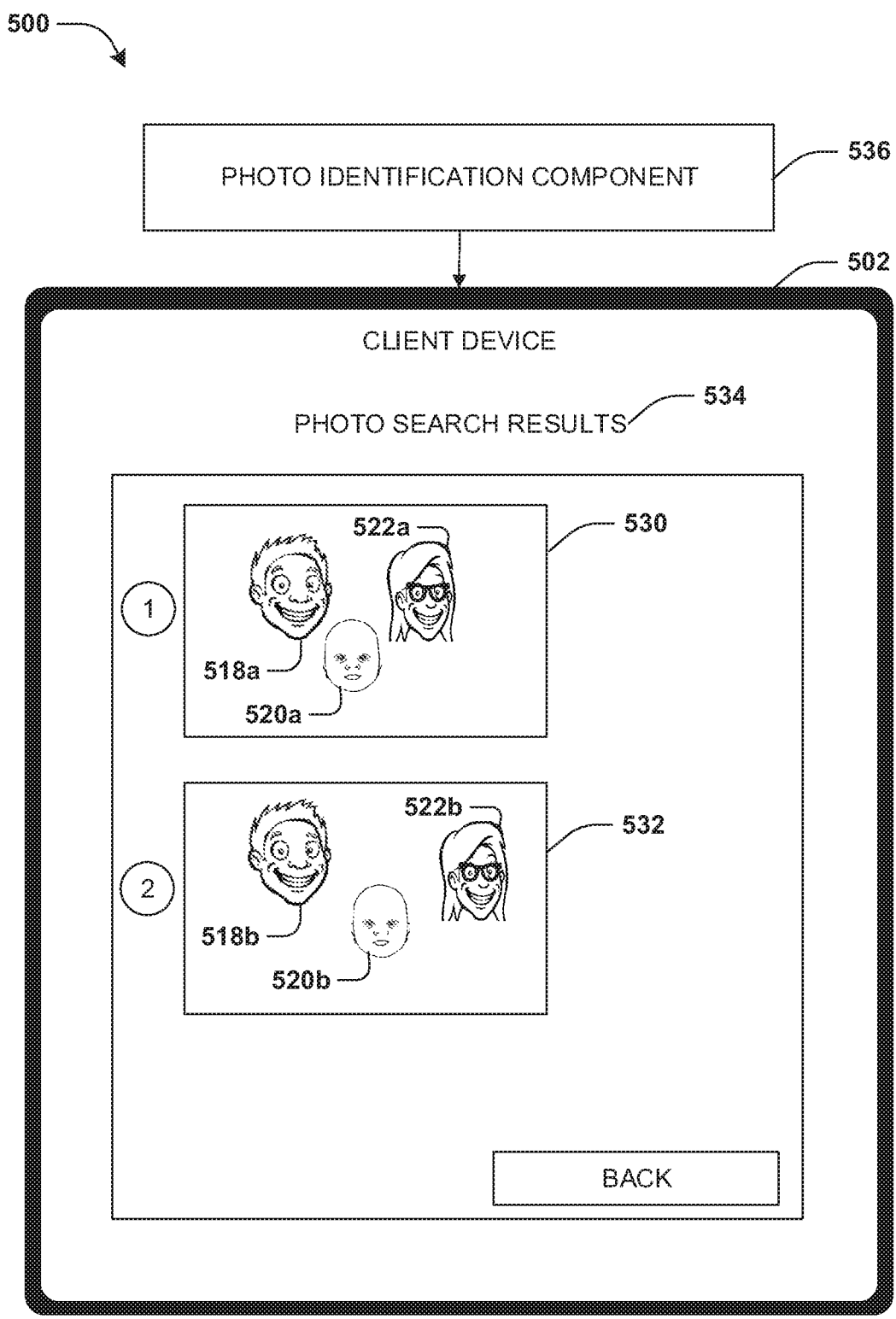
FIG. 5C is a component block diagram illustrating an example system for searching images, where a photo query is used to generate photo search results.

FIGS. 5A-5C illustrate an example of a system 500 for searching images using a photo query interface 504. FIG. 5A illustrates a photo identification component 536 displaying a facial attributes page 525 through a client device 502. The user may be presented with an option to specify facial features (e.g., gender, age, accessories, skin tone, etc.) of a proxy icon 522 used to query photos depicting people having similar features as the proxy icon 522 (e.g., photos depicting a pale skin adult female with glasses). The facial attributes page 525 may comprise a display interface 524 (e.g., where the proxy icon 522 may be displayed during construction of the proxy icon 522), proxy icon construction options 526 for constructing the proxy icon 522 (e.g., utilizing drag and drop construction icons), and/or facial features 528 for constructing the proxy icon 522. In an example, the user may select a generic proxy icon 526a, a child proxy icon 526e, a male proxy icon 526b, and/or a female proxy icon 526f to display in the display interface 524 for construction of the proxy icon 522. In an example, the user may select accessories that may identify a person that the user may desire to find in a photo. In an example, the user may select facial attributes, such as glasses 526c, a mustache 526g, hair color 526d (e.g., brown, black, blond, red, etc.), a beard 526h, and/or a wide variety of other features that may visually distinguish different people to help identify a photo, depicting the person, that the user may desire to find. In an example, the user may select the female proxy icon 526f, blond hair, and glasses 526c for construction of the proxy icon 522.

In an example, the user may select the facial features 528 for construction of the proxy icon 522 by selecting features from a table 529. The user may select the gender of the proxy icon 522 (e.g., as unspecified, male, female, etc.). The user may select the age of the proxy icon (e.g., as unspecified, adult, child, or a user inputted age). The user may select accessories for the proxy icon 522 (e.g., glasses, facial hair, a hat, etc.). The user may select the skin tone of the proxy icon 522. In an example, the user may remember there was a women in the photo, but not remember the women's skin tone, hair color, etc., and thus the user may merely select female as the gender of the proxy icon 522 and may leave age, accessories, and/or skin tone unspecified. The user may select an option indicating that the user is done constructing the proxy icon 522. Based upon completed construction of the proxy icon 522, the proxy icon 522 (e.g., the female proxy icon 526f wearing glasses 526c) may be provided to the photo identification component 536 for querying a repository of photos to identify one or more photos that may comprise a person that may appear relatively similar to the proxy icon 522.

FIG. 5B illustrates the user constructing a second proxy icon 518 illustrating an adult male and a third proxy icon 520 illustrating a child. The user may place the proxy icon 522, the second proxy icon 518, and/or the third proxy icon 520 on the grid 506 to generate a photo query. The placement of the proxy icon 522, the second proxy icon 518, and/or the third proxy icon 520 may correspond to positions of people in a photo the user may desire to find. Responsive to the user selecting 553 a search option 552, the photo query may be provided to the photo identification component 536 for querying a repository of photos to identify one or more photos that may comprise people that appear relatively similar to the proxy icon 522, the second proxy icon 518, and/or the third proxy icon 520 and/or positions of such icons.

FIG. 5C illustrates the photo identification component 536 generating photo search results 534. The photo identification component 536 may identify face query attributes and face position query attributes (e.g., the relative positions of the proxy icon 522, the second proxy icon 518, and/or the third proxy icon 520) from the photo query, which may be evaluated using a photo feature detection model. The photo feature detection model may be utilized to identify the facial features in the face query attribute. In an example, the photo feature detection model may identify the gender, age, skin tone, hair color, accessories, etc., of the proxy icon 522, the second proxy icon 518, and/or the third proxy icon 520.

The photo identification component 536 may search a database comprising one or more photos to identify one or more photos (e.g., such as a first photo 530 and/or a second photo 532) depicting people having attributes corresponding to the photo query. In an example, the attributes of the photo query may comprise facial features of the proxy icon 522 in a position corresponding to the position of the proxy icon 522, facial features of the second proxy icon 518 in a position corresponding to the position of the second proxy icon 518, and/or facial features of the third proxy icon 520 in a position corresponding to the position of the third proxy icon 520.

Responsive to identifying one or more photos corresponding to the photo query, the one or more photos may be presented to the user, on the client device 502, as the photo search results 534. The photo search results 534 may be ranked. In an example, the first photo 530 may have a first face 522a (e.g., of a female adult wearing glasses) in a first position similar to the position of the proxy icon 522, a second face 518a (e.g., of a male adult) in a second position similar to the position of the second proxy icon 518, and/or a third face 520a (e.g., of a child) in a third position similar to the position of the third proxy icon 520.

In an example, the second photo 532 may have a fourth face 522b (e.g., of a female adult wearing glasses) in a fourth position similar to the position of the proxy icon 522, a fifth face 518b (e.g., of a male adult) in a fifth position similar to the position of the second proxy icon 518, and/or a sixth face 520b (e.g., of a child) in a sixth position similar to the position of the third proxy icon 520. The first photo 530 may be ranked higher than the second photo 532 because first, second and third positions of the first photo 530 may be relatively more similar to positions of the proxy icons than the fourth, fifth, and sixth positions of the second photo 532.

Figure 6A:
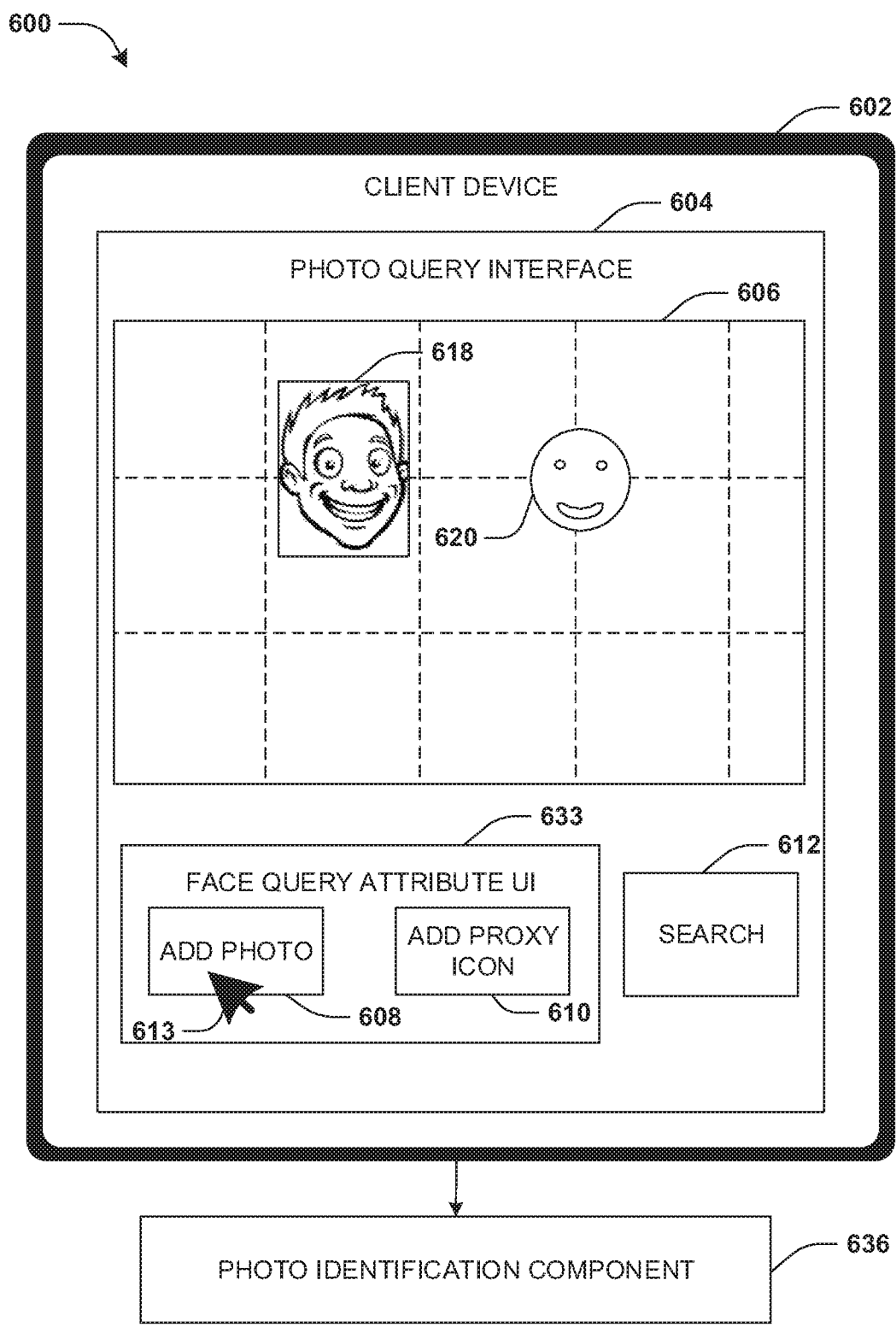
FIG. 6A is a component block diagram illustrating an example system for searching images, where a photo query is constructed using a photo of a face.
Figure 6B:
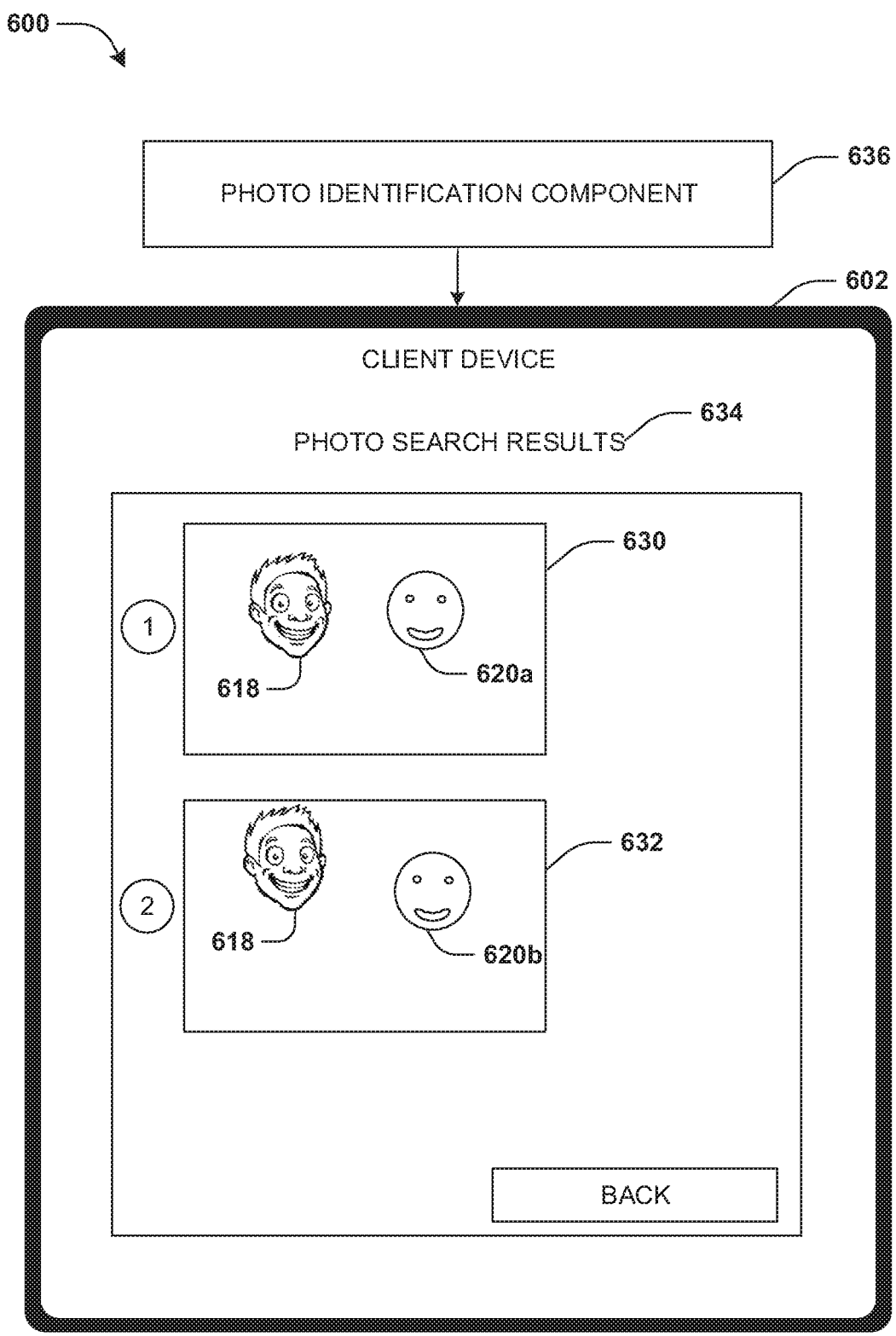
FIG. 6B is a component block diagram illustrating an example system for searching images, where a photo query is used to generate photo search results.

FIGS. 6A-6B illustrate an example of a system 600 for searching images using a photo query interface 604. A user, on a client device 602, may access the photo query interface 604 generated by a photo identification component 636. The photo query interface 604 may present the user with a face query attribute user interface 633 comprising an option to add a photo 608 and/or add a proxy icon 610. In an example, the user may select 613 the add a photo 608 option. The user may be presented with a photo database (e.g., comprising photos on the client device 602, on social media, on remote storage, etc.). The user may select a person and/or face from a photo (e.g., the user may crop the photo to isolate the face) to generate a photo of a face 618.

The user may place the photo of a face 618 at a first position on a grid 606 of the photo query interface 604. The user may place a proxy icon 620 at a second position on the grid 606. In an example, the user may desire to find a photo of a first person, depicted by the photo of a face 618, at the first position within the photo and of a second person, having similar features of the proxy icon 620, at the second position within the photo. The user may select search 612 after placing the photo of a face 618 and/or the proxy icon 620 in desired positions on the grid 606. Responsive to the user selecting search 612, the photo identification component 636 may construct a photo query based upon the location of the photo of a face 618 and/or the proxy icon 620.

FIG. 6B illustrates the photo identification component 636 generating photo search results 634. The photo identification component 636 may identify face query attributes and face position query attributes (e.g., the relative positions of the photo of a face 618 and/or the proxy icon 620) from the photo query, which may be evaluated using a photo feature detection model. The photo feature detection model may be utilized to identify the facial features in the face query attribute. In an example, the photo feature detection model may identify the face from the photo of a face 618 (e.g., using facial recognition technology).

The photo identification component 636 may search photos (e.g., local storage, remote storage, a website, a social network account, etc.) to identify one or more photos, such as a first photo 630 and/or a second photo 632, comprising a first face in a position corresponding to the first position of the photo of the face 618 and/or a second face in a position corresponding to the second position of the proxy icon 620. Responsive to identifying one or more photos corresponding to the photo query, the one or more photos may be presented to the user, on the client device 602, as the photo search results 634. The photo search results 634 may be ranked. In an example, the first photo 630 may have the face 618 in a first position similar to the position of the photo of a face 618 and/or a second face 620a in a second position similar to the position of the proxy icon 620. In an example, the second photo 632 may have the face 618 in a third position similar to the position of the photo of a face 618 and/or a third face 620b in a fourth position similar to the position of the proxy icon 620.

Figure 7A:
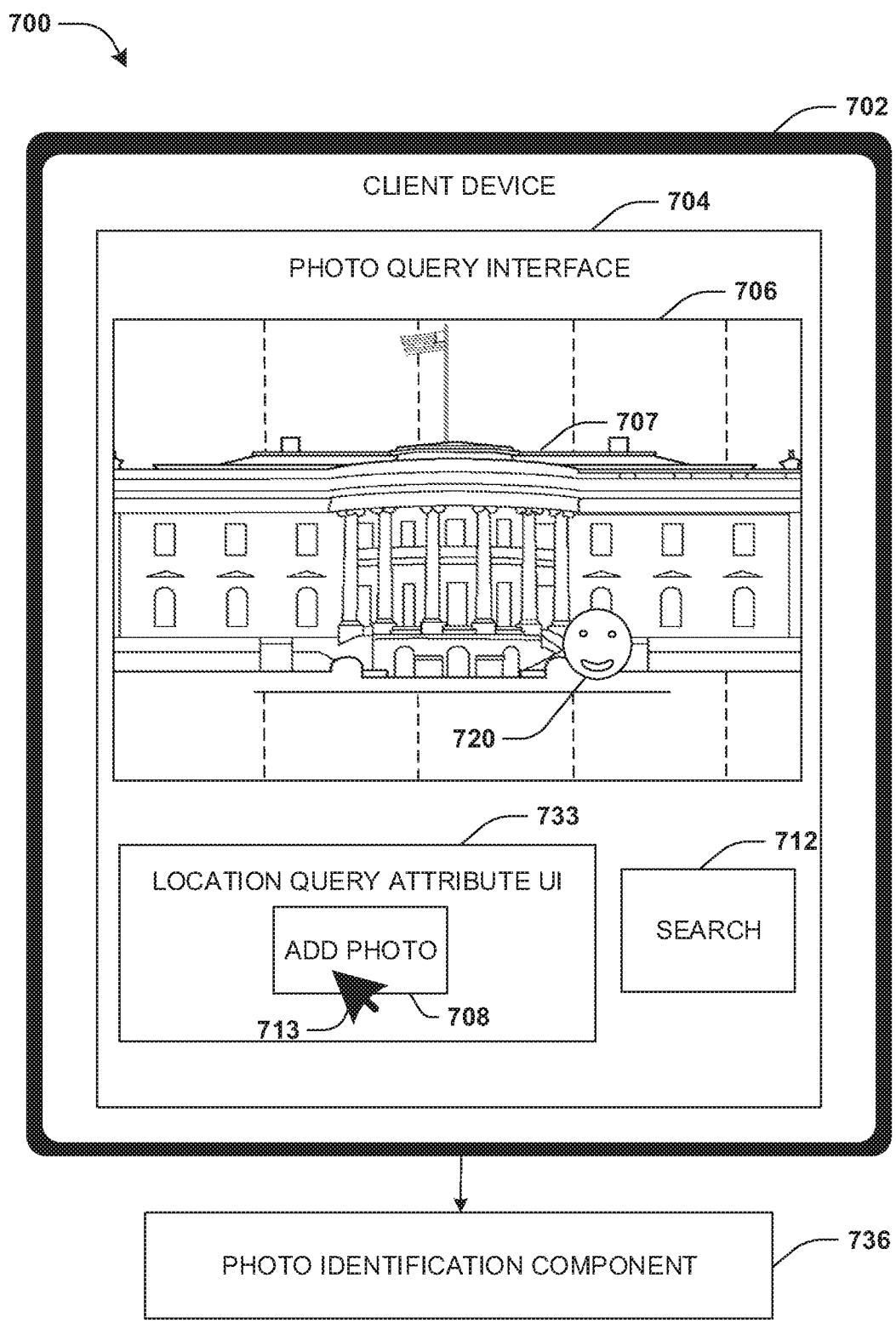
FIG. 7A is a component block diagram illustrating an example system for searching images, where a photo query is constructed using a location query attribute.
Figure 7B:
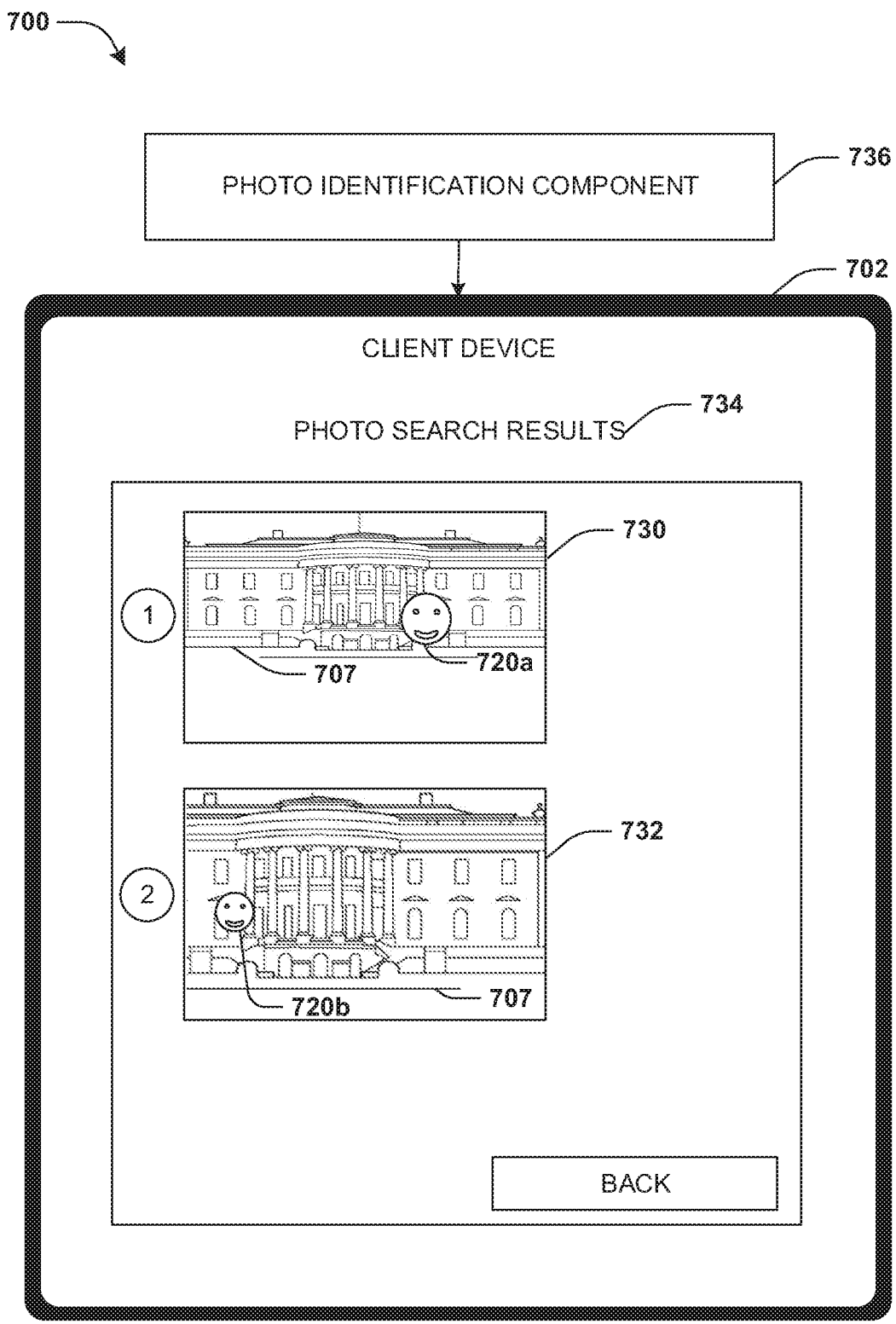
FIG. 7B is a component block diagram illustrating an example system for searching images, where a photo query is used to generate photo search results.

FIGS. 7A-7B illustrate an example of a system 700 for searching images using a photo query interface 704. A user, on a client device 702, may access the photo query interface 704 generated by a photo identification component 736. The photo query interface 704 may present the user with a location query attribute user interface 733 comprising an option to add a photo 708 of a location. In an example, the user may select 713 the add a photo 708 option and select a photo of a location 707 (e.g., such as a location that is depicted in a photo that the user desires to find). In an example, the user may desire to find a photo of a head of state's residence.

The user may place a proxy icon 720 on a grid 706 of the photo query interface 704 over the location 707. The user may place the proxy icon 720 in a position corresponding to a position of a person's face depicted in the photo that the user desires to find. The photo identification component 736 may construct a photo query based upon the location 707 and the proxy icon 720.

FIG. 7B illustrates the photo identification component 736 generating photo search results 734. The photo identification component 736 may identify location query attributes from the photo query for use by a photo feature detection model. The photo feature detection model may be utilized to identify features of the location 707 in the location query attribute, which may be used to locate photos depicting the location 707 (e.g., photos having similar features).

The photo identification component 736 may search photos to identify one or more photos, such as a first photo 730 and/or a second photo 732, depicting the location 707 and a face in a position corresponding to the position of the proxy icon 720. Responsive to identifying one or more photos corresponding to the photo query, the one or more photos may be presented to the user, on the client device 702, as the photo search results 734. The photo search results 734 may be ranked. In an example, the first photo 730 may have a face 720a in a first position that is relatively more similar to the position of the proxy icon 720 in front of the location 707 than a second position of the proxy a second face 720b within the second photo 732, and thus the first photo 730 may be ranked higher than the second photo 732.

Figure 8A:
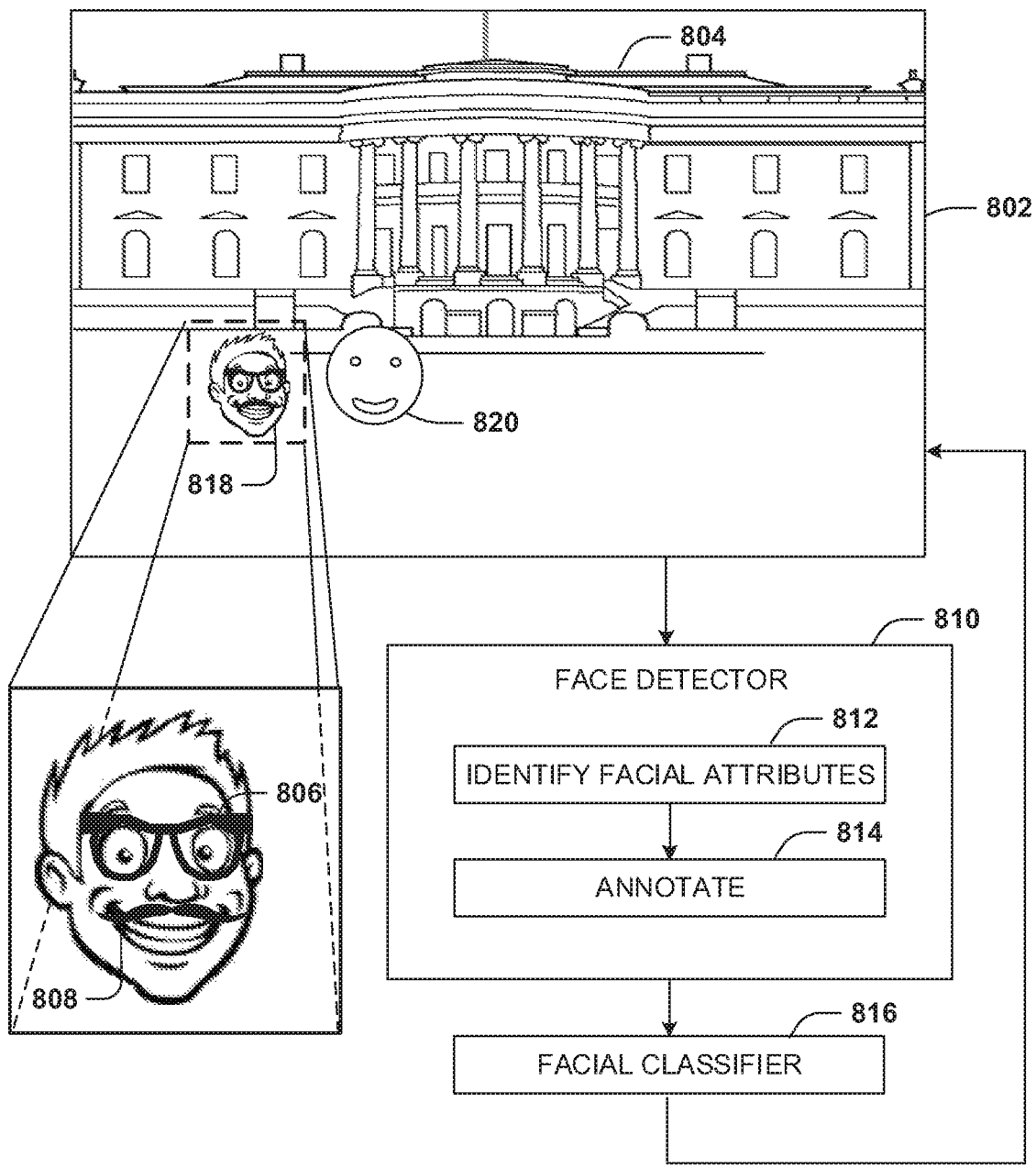
FIG. 8A is a component block diagram illustrating an example system for searching images, where a face detector identifies facial attributes.
Figure 8B:
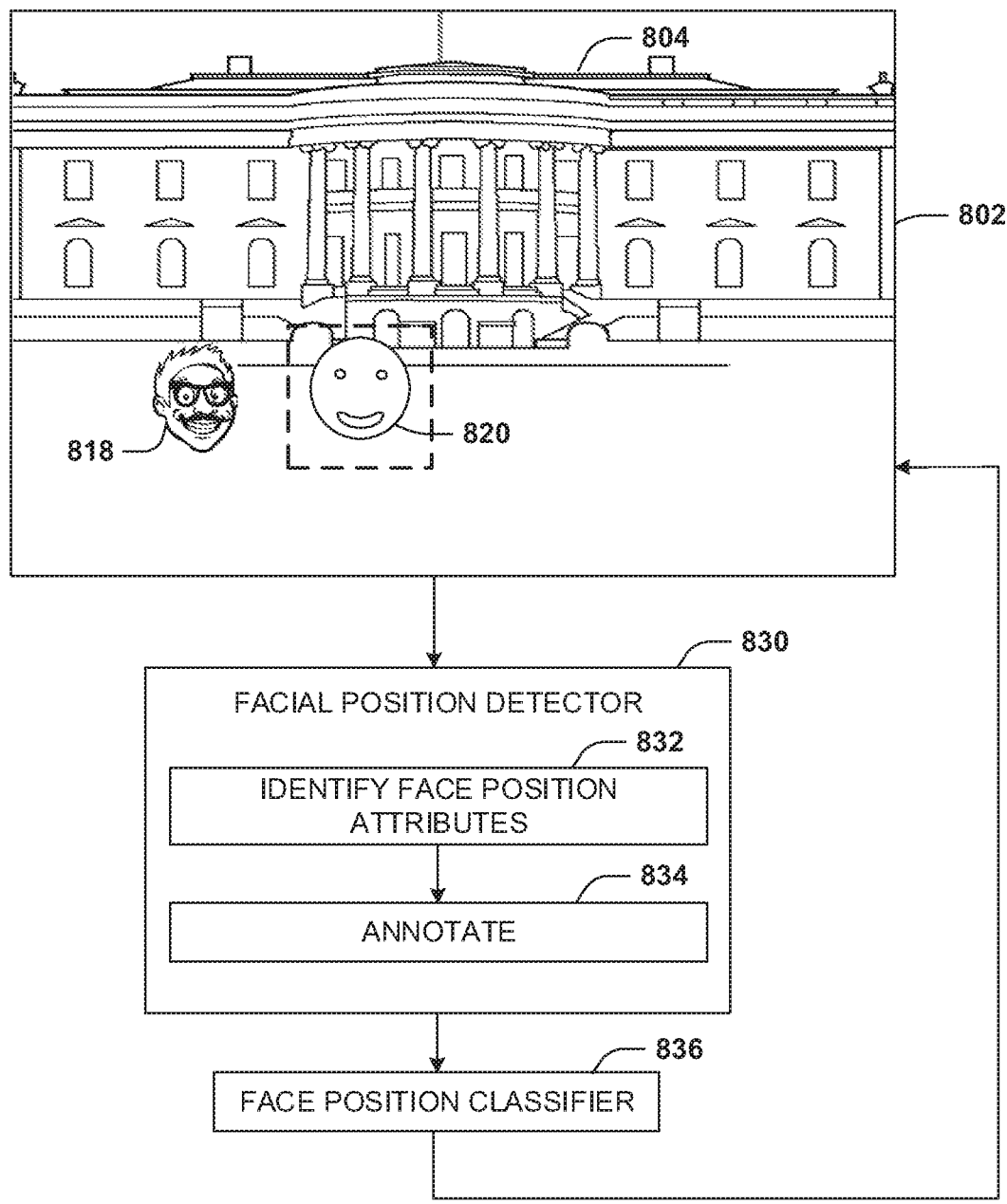
FIG. 8B is a component block diagram illustrating an example system for searching images, where a facial position detector identifies face position attributes.
Figure 8C:
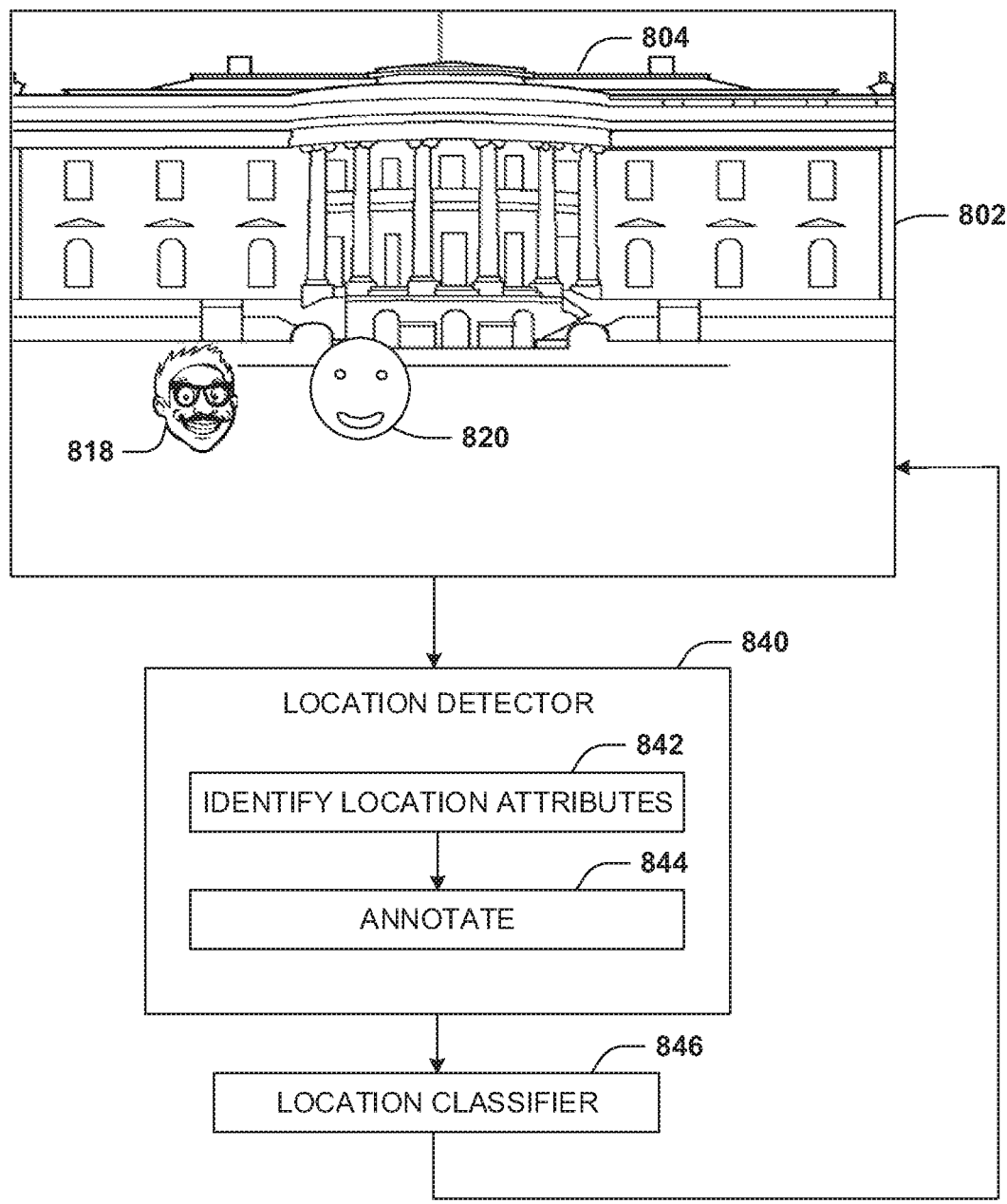
FIG. 8C is a component block diagram illustrating an example system for searching images, where a location detector identifies location attributes.

FIGS. 8A-8C illustrate photo organization functionality for annotating photos with classifiers for grouping photos in a database. In an example, a photo 802 may comprise attributes, such as facial attributes 812 (e.g., an identification of a person, eyes, nose, mouth, accessories, hair color, skin tone, age, gender, etc.), face position attributes 832 (e.g., where a face is positioned in the photo 802), and/or location attributes 842 (e.g., where the photo 802 was taken, such as near a famous landmark, in a forest, on a mountain, etc.). Sets of manually labeled photos may be utilized to build classifiers for the attributes. The classifiers may be trained to detect attributes in unlabeled photos (e.g., photos without classifications/labels). The attributes may be learned through utilization of a combination of Support Vector Machines (SVM) (e.g., a learning model that analyzes data and recognizes patterns) and learning algorithms (e.g., such as adaptive boosting). Training data (e.g., manually annotated photos) may be used to train an annotator to create a trained annotator. The trained annotator may be used to annotate test photos (e.g., photos identified from a secondary database) and photos from a photo database. The trained annotator may be used to identify facial attributes for photos from the secondary database.

FIG. 8A illustrates a face detector 810 identifying the facial attributes 812 of a person 818 (e.g., the facial attributes comprising a face, glasses 806, a mustache 808, etc.) from the photo 802. The photo 802 may be annotated 814 (manually and/or automatically) with a facial classifier 816 corresponding to the facial attributes 812. Facial features may be annotated manually and decomposed into the facial attributes 812. An extractor module may be used to extract the facial attributes 812 from the photo 802. The extractor module may extract low-level features (e.g., local binary patterns, histogram of oriented gradients, color histogram, and color moments) from individual facial attributes 812.

The facial classifiers 816 may be trained using machine learning methods (e.g., such as discriminative learning and/or adaptive boosting). A number of "local" SVMs may be constructed and the learning algorithm software may create a first facial classifier using a linear combination of the local SVMs, a second facial classifier, etc. In an example, one SVM may be created for each region, feature type, and/or SVM parameter combination (e.g., using a library for SVMs).

Responsive to receiving a photo query comprising a face query attribute corresponding to a facial attribute present in the photo 802 (e.g., the photo query comprises the glasses 806, a male gender query term, and/or a photo of a face that is the same or similar to the face in the photo 802), the photo 802 may be identified based upon the facial classifier 816. Responsive to receiving the photo query, a relative entropy of language models may be used as a ranking function. The ranking function may rank facial attributes according to a relevance value. The relevance value of the facial attributes, with respect to the photo query, may be measured by a KL-divergence. A photo or photos with a highest relevance value may be provided to the user. In an example, the photo query may comprise the facial attribute of glasses 806, which matches the facial attribute of the person 818 in the photo 802.

FIG. 8B illustrates the photo organization functionality extracting the face position attributes 832 from the photo 802 using a face position detector 830. The face position attributes 832 may comprise a position of a second person 820 relative to an edge of the photo 802, relative to the person 818, etc. The photo 802 may be annotated with a face position classifier 836 corresponding to the face position attributes 832. Responsive to receiving a photo query comprising a face position query attribute corresponding to the face position attribute 832, the photo 802 may be identified based upon the face position classifier 836 and may be provided to the user.

FIG. 8C illustrates the photo organization functionality extracting the location attributes 842 from the photo 802 using a location detector 840. The location attributes 842 may be extracted by capturing visual characteristics (e.g., color, texture, etc) of the photo 802. Color may be determined using Red Green Blue (RGB) values of pixels in a region of interest. The RGB values may be converted into a Hue Saturation Value (HSV) color space. In an example, the HSV color space may be separated into a number of color bins (e.g., 30 color bins) and each pixel may be quantized based upon the binning. Texture may be determined using Local Binary Pattern (LBP) and/or Scale Invariant Feature Transform (SIFT).

The HSV color space, the LBP, and/or the SIFT may be clustered to build a visual dictionary and mapped to form a visual word. The location detector 840 may be used to identify location attributes 842 (e.g., a background of the photo 802) for each photo using the visual word. The location detector 840 may differentiate the location attributes 842 from the facial attributes 812 by utilizing the face detector 810, as illustrated in FIG. 8A, to identify facial attributes 812. The photo 802 may be annotated 814 with a location classifier 846 corresponding to the location attribute 842.

Responsive to receiving the photo query, the relative entropy of the language models may be used as the ranking function. The ranking function may rank location attributes 842 according to the relevance value assigned to the photo 802 relative to the photo query. In an example, the photo query may comprise the location query attribute of a presidential residence 804, which matches the location attribute 842 in the photo 802.

Figure 9:
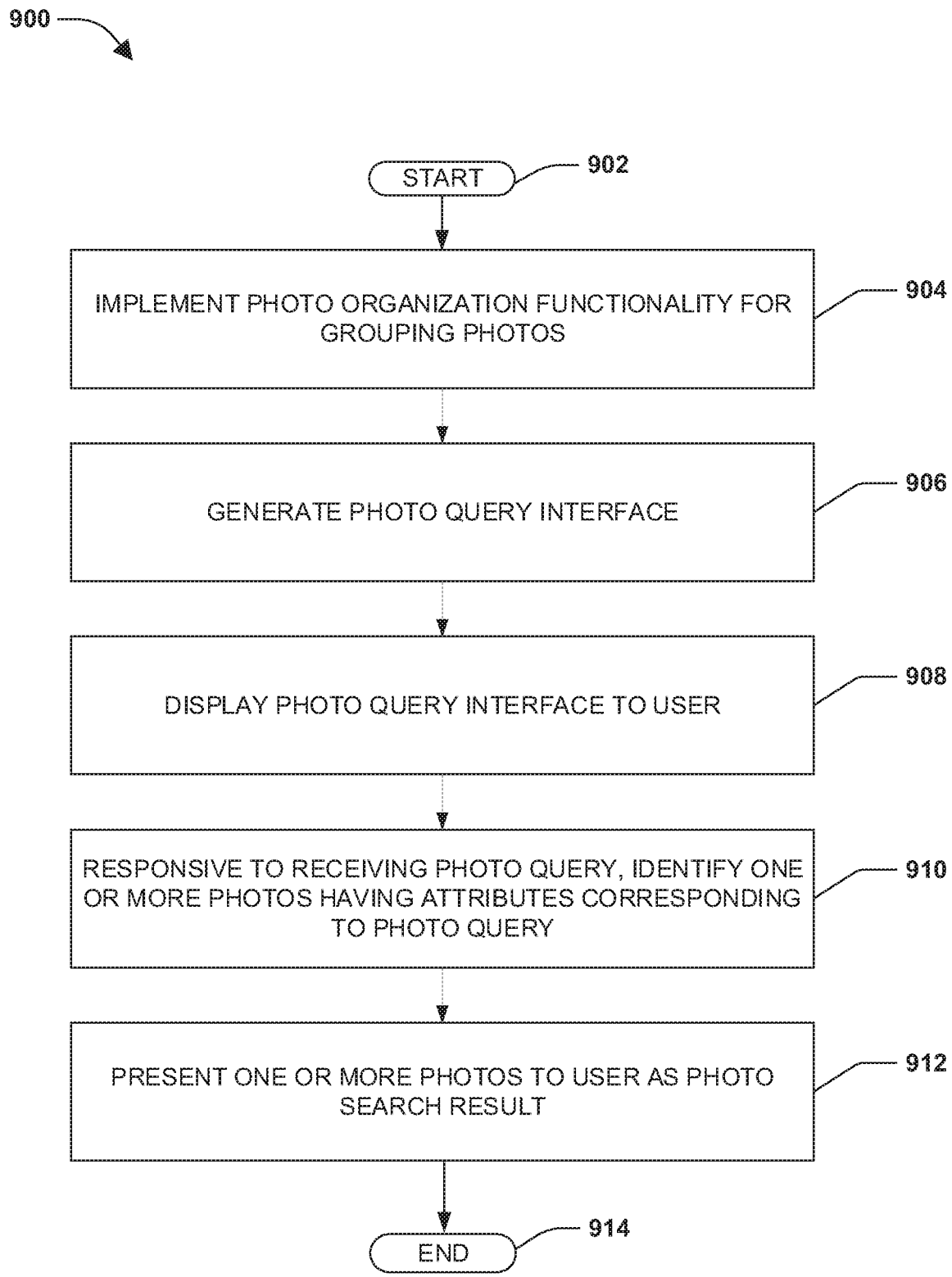
FIG. 9 is a flow diagram illustrating an example method for searching images.

FIG. 9 is an illustration of a method 900 for searching photos. At 902, the method 900 starts. At 904, a photo organization functionality for grouping photos based upon a face position attribute, a face attribute, and/or a location attribute may be implemented. At 906, a photo query interface may be generated. The photo query interface may be populated with a face position query attribute, a face query attribute, and/or a location query attribute. At 908, the photo query interface may be displayed to a user. At 910, responsive to receiving the photo query through the photo query interface, one or more photos having attributes corresponding to the photo query attributes, as grouped by the photo organization functionality, may be identified. At 912, the one or more photos may be presented to the user as photo search results. At 914, the method 900 ends.

Figure 10:
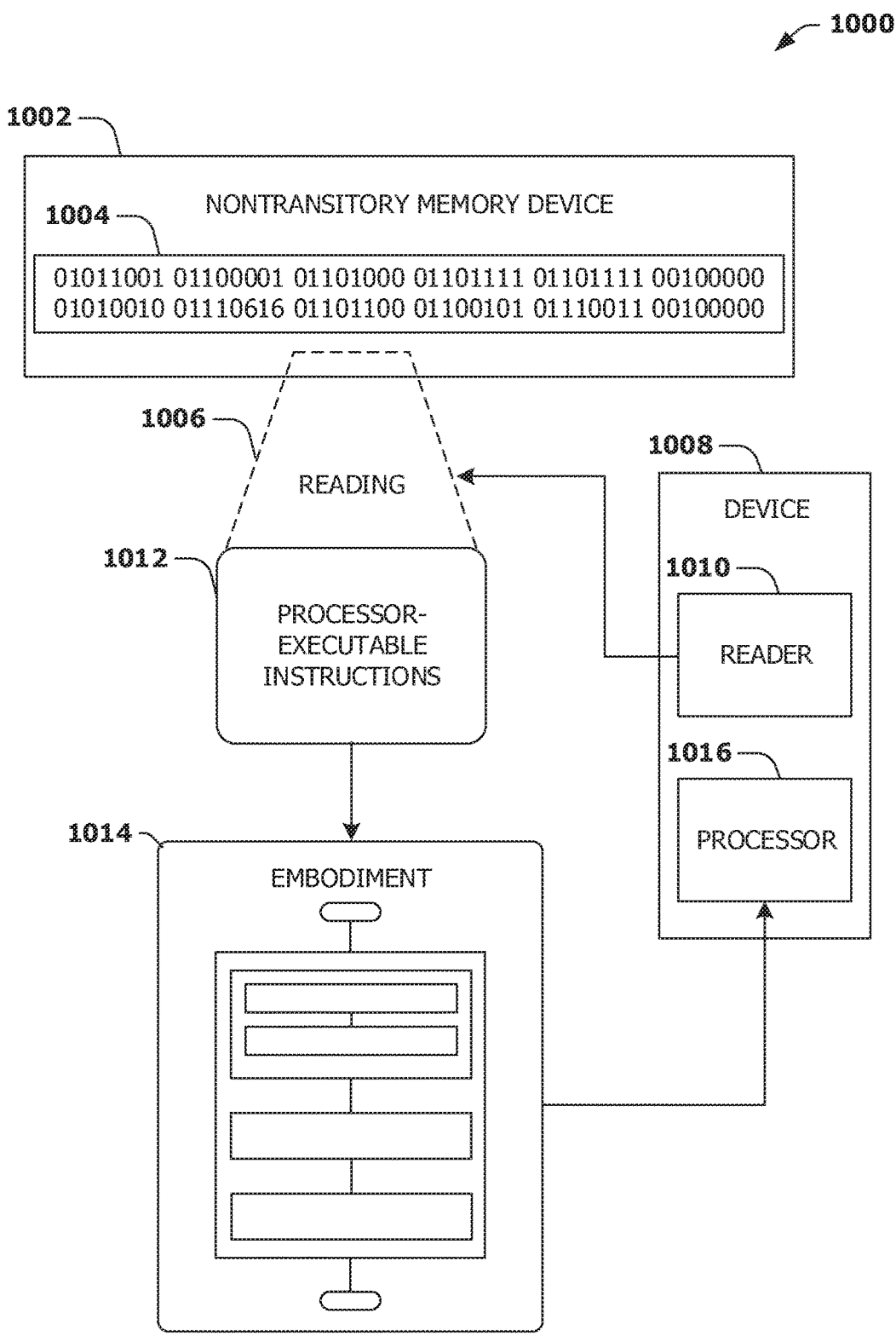
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 900 of FIG. 9. In some embodiments, the processor-executable instructions, when executed on the processor 1016 of the device 1008, are configured to implement a system, such as at least some of the example system 400 of FIGS. 4A-4B, at least some of the example system 500 of FIGS. 5A-5C, at least some of the example system 600 of FIGS. 6A-6B, at least some of the example system 700 of FIGS. 7A-7B, and/or at least some of the example system 800 of FIGS. 8A-8C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for searching images, the system comprising:
a processor; and
memory comprising instructions that when executed by the processor implement a photo identification component configured to:
generate a photo query interface populated with a user interface element associated with at least one of a face query attribute, a face position query attribute, or a location query attribute;
display the photo query interface to a user, wherein the user interface element displayed in the photo query interface is movable from a first position of a grid of the photo query interface to one or more other positions of the grid of the photo query interface;
receive a photo query constructed based upon a dragging and dropping, by the user, of the user interface element from the first position of the grid of the photo query interface to a second position of the grid of the photo query interface, wherein the photo query is indicative of the second position of the grid of the photo query interface to which the user interface element was dragged and dropped;
identify one or more photos based upon the photo query indicative of the second position of the grid of the photo query interface to which the user interface element was dragged and dropped; and
present the one or more photos to the user as photo search results.

2. The system of claim 1, the photo identification component configured to:
identify a position of the user interface element relative to a perimeter of the photo query interface,
wherein the identifying the one or more photos is based upon the position relative to the perimeter.

3. The system of claim 1, the face query attribute comprising a photo of a face.

4. The system of claim 1, wherein the identifying the one or more photos is based upon at least one of gender, age, accessories, or skin tone.

5. The system of claim 1, the face query attribute comprising a proxy icon.

6. The system of claim 1, the face position query attribute corresponding to a position of a face within photos.

7. The system of claim 1, the location query attribute corresponding to features of a background of a photo.

8. The system of claim 1, the photo identification component configured to:
implement a photo organization functionality for grouping photos based upon at least one of a face position attribute, a face attribute, or a location attribute.

9. A method for searching images, the method comprising:
generating a photo query interface populated with a user interface element associated with at least one of a face position query attribute, a face query attribute, or a location query attribute;
displaying the photo query interface to a user, wherein the user interface element is displayed in a grid of the photo query interface, wherein one or more attributes of the user interface element are selectable in the photo query interface;
receiving a photo query constructed based upon a selection, by the user, of an attribute of the user interface element in the photo query interface, wherein the photo query is indicative of the attribute of the user interface element;
identifying one or more photos based upon the photo query indicative of the attribute of the user interface element selected in the photo query interface; and
presenting the one or more photos to the user as photo search results.

10. The method of claim 9, comprising:
facilitating user construction of the photo query based upon a drag and drop command of at least one of the face position query attribute, the face query attribute, or the location query attribute.

11. The method of claim 9, the face query attribute comprising a photo of a face.

12. The method of claim 9, wherein the identifying the one or more photos is based upon at least one of gender, age, accessories, or skin tone.

13. The method of claim 9, the face query attribute comprising a proxy icon.

14. A non-transitory machine readable medium having stored thereon processor-executable instructions that when executed cause performance of operations, the operations comprising:
generating a photo query interface populated with a user interface element;
displaying the photo query interface to a user, wherein the user interface element displayed in the photo query interface is movable from a first position of a grid of the photo query interface to one or more other positions of the grid of the photo query interface;
receiving a photo query constructed based upon a dragging and dropping, by the user, of the user interface element from the first position of the grid of the photo query interface to a second position of the grid of the photo query interface, wherein the photo query is indicative of the second position of the grid of the photo query interface to which the user interface element was dragged and dropped;
identifying one or more photos based upon the photo query indicative of the second position of the grid of the photo query interface to which the user interface element was dragged and dropped; and
presenting the one or more photos to the user as photo search results.

15. The non-transitory machine readable medium of claim 14, wherein the user interface element is associated with a face query attribute.

16. The non-transitory machine readable medium of claim 14, wherein the user interface element is associated with a face position query attribute.

17. The non-transitory machine readable medium of claim 14, wherein the user interface element is associated with a location query attribute.

18. The non-transitory machine readable medium of claim 14, the operations comprising:
implementing a photo organization functionality for grouping photos based upon a face position attribute.

19. The non-transitory machine readable medium of claim 14, the operations comprising:
implementing a photo organization functionality for grouping photos based upon a face attribute.

20. The non-transitory machine readable medium of claim 14, the operations comprising:
   implementing a photo organization functionality for grouping photos based upon a location attribute.

* * * * *